Nov. 7, 1950 G. A. TINNERMAN 2,528,675
FASTENING DEVICE
Filed Jan. 20, 1947

Inventor
George A. Tinnerman,
By H. G. Lombard,
Attorney

Patented Nov. 7, 1950

2,528,675

UNITED STATES PATENT OFFICE 2,528,675

FASTENING DEVICE

George A. Tinnerman, Cleveland, Ohio, assignor to Tinnerman Products, Inc., Cleveland, Ohio, a corporation of Ohio Application January 20, 1947, Serial No. 723,088

4 Claims. (Cl. 287—53)

This invention relates in general to fastening devices and deals, more particularly, with an improved clip fastener which is used as an insert in a molded rubber or plastic knob, handle or similar article for attaching the knob to a rod or equivalent stud member in a strong and durable connection that may be assembled with ease and facility in a minimum of time and effort.

The fastener is one of general utility in that it may be employed in a wide range and variety of applications for connecting an apertured part to a stud, shaft, or the like, or to an associated part or operating member. The invention has particular application in the attachment of a rubber or plastic knob to a locking rod used on the doors of many types of automobiles to manipulate the latching mechanism of the door lock. In the use of knobs having ordinary threaded bores, or conventional threaded inserts, the attachment of the knobs is slow and time consuming inasmuch as such knobs must be precisely threaded over each convolution of the entire thread portion of the locking rod within the knob cavity. In present day assembly line methods, speed of assembly is an important factor, and accordingly, a primary object of the invention is to provide an improved knob construction comprising a spring metal insert designed to permit quick and easy attachment of a knob to the end of a rod or other stud in a simple axial thrust by which the knob is automatically secured to the locking rod in a rigid and positive connection that is not subject to loosening or unintended removal.

Another object of the invention is to provide a knob construction of this character in which the spring metal insert includes resilient securing tongues or similar elements which readily ratchet over the screw threads on the locking rod as the knob is pushed thereon, and which, in the fully applied position of the knob, effect a thread locking action on the screw threads to prevent accidental loosening or removal of the knob.

A further object of the invention is to provide an insert construction of the kind described in which the securing tongues thereof otherwise are adapted for threaded engagement with the screw threads on the locking rod in order to permit removal of the knob when necessary for servicing the door, for example, simply by unscrewing the knob in the conventional manner.

An additional object of the invention is to provide such a knob connection comprising an insert having a substantial frictional bearing engagement with the body of the locking rod and a resilient thread locking action with the screw threads on the locking rod under constant spring tension.

Further objects and advantages of the invention and other new and useful features in the construction, arrangement and general combination of parts will be readily apparent as the following description proceeds with reference to the accompanying drawings, for purposes of illustration but not of limitation, in which like reference characters designate like parts throughout, and in which.

Figure 1:
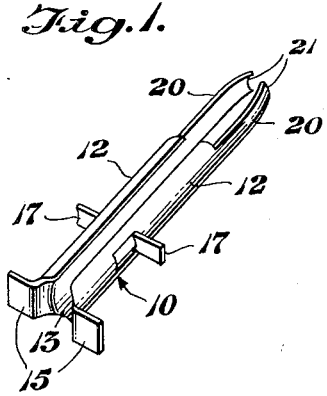
Fig. 1 is a perspective view of the spring metal insert employed in the invention.
Figure 5:
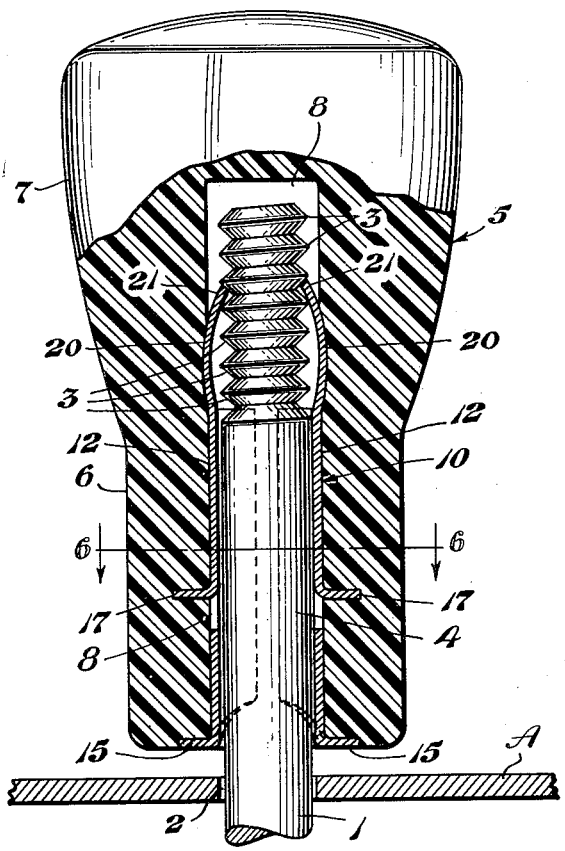
Fig. 5 is a vertical elevational view, partly in section, showing a knob assembly embodying the insert construction of the invention.
Figure 2:
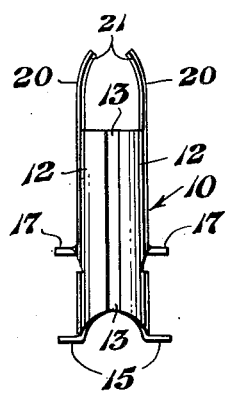
Fig. 2 is a side elevational view of the insert.
Figure 3:
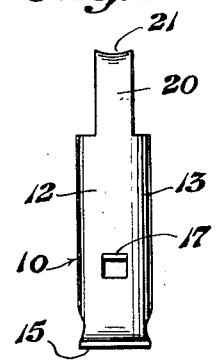
Fig. 3 is an elevational view of the insert as seen from either side of Fig. 2.

Referring now, more particularly, to the drawings, Figs. 1-4 inclusive show a preferred construction of the insert employed in the improved knob mounting illustrated in Fig. 5. As an example, the knob mounting is shown installed on a reciprocable type of locking rod I provided on the door of an automobile in position to be readily pushed or pulled to actuate the associated door latch to locked or unlocked position from the interior of the vehicle, independently of the key locking mechanism on the door. Such a locking rod I usually extends vertically of the door frame and projects through an opening 2 in the sill or ledge A of the window opening in the door. The free end of the locking rod is provided with threads 3 or equivalent serrations adjacent a cylindrical rod portion 4 extending through the opening in the window ledge A. The locking rod I otherwise may be of any desired design or cross section for use with any selected type of door locking mechanism or other operating structure.

The knob or handle designated generally 5 is made of any suitable rubber or plastic material, or the like, in any desired design. In the present illustration, the knob comprises a substantially cylindrical body portion 6 flaring outwardly into an enlarged head 7 which may be readily grasped and manipulated by the fingers to effect a pull or push on the locking rod. A central bore 8 in the knob is of a diameter slightly larger than the cross section of the locking rod to accommodate the spring metal insert 10 which in turn receives the free end of the locking rod 1 substantially as shown in Fig. 5.

The insert 10, Figs. 1-4, is a simple, inexpensive article of manufacture which may be made at comparatively low cost from standard sheet metal strip stock with little loss or waste of material. Any suitable sheet metal material may be employed, preferably of a spring metal nature such as spring steel or cold rolled steel having spring characteristics. The insert is provided preferably in a generally channel-shaped construction to comprise a pair of resilient shank sections 12, one being located on each side of a rear wall 13. The shank sections 12 are expansible and contractible relative to each other, and when normally untensioned, define a channel-shaped formation having a cross-sectional area substantially equal to or slightly smaller than the cross-section of the locking rod 1. One end of the channel-shaped insert is formed with outwardly bent flanges 15 or head portions defining the head of the fastener. Preferably a single flange 15 is provided on each of the shank sections 12 along with intermediate cutout portions therebetween to facilitate the initial application of the knob onto the end of a locking rod or other stud. A head member on the insert may be provided in any other suitable manner as by a series of flanges 15 around the periphery of the channel-shaped shank or by an equivalent continuous outwardly bent rim element, or the like.

The body of the channel-shaped insert includes anchoring means such as one or more outwardly projecting tabs or lugs 17 on each of the shank sections 12. Such anchoring means may be provided in any suitable way by integral or separate elements on the shank sections, and in the present example, the tabs 17 shown are easily formed by slit areas of the shank sections which are bent outwardly out of the plane thereof.

The forward end of the channel-shaped body of the insert includes one or more, preferably two, elongate extensions defining securing tongues 20 adapted for threaded engagement with the threads on the locking rod or other stud. Said tongues are slightly rounded transversely in the manner of longitudinal corrugations providing for increased strength and rigidity therein and otherwise, are curved lengthwise, with the tongue extremities 21, Fig. 7, bent inwardly toward each other and arcuately shaped to conform generally to the circular configuration of the thread convolutions 3 on the locking rod. The arcuate shape of the tongue extremities provides for uniform threaded engagement thereof with the thread convolutions 3 under constant spring tension as a result of the inwardly biased disposition of said tongues, particularly when urged inwardly toward each other in the assembled position of the insert in the bore of the knob.

With the spring metal insert formed substantially in the manner described, it will be understood that it is incorporated in a rubber or plastic article such as a knob construction, shown in Fig. 5, in the conventional molding of the knob or other part, and by the usual method in which ordinary threaded inserts are provided in rubber or plastic parts in general. In the completed insert construction, the flanges 15 defining the head of the insert bear upon the outer surface of the knob or other part to limit the inward movement of the insert within the bore 8 and otherwise maintain the insert in proper position at all times. The outward projections or tabs 17 are embedded in the rubber or plastic material of the knob or other plastic body to anchor the insert in position against axial movement in either direction, as well as against relative rotative movement within the bore 8. The curved tongues 20 extend free within the bore 8 and are biased slightly inwardly toward each other in normal untensioned relation, and are so supported by the engagement thereof with the adjacent walls of the bore 8, as shown in Fig. 5.

Figure 6:
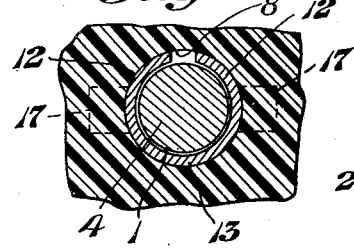
Fig. 6 is a sectional view on line 6—6 of Fig. 5 looking in the direction of the arrows; and, Fig. 7 is a close-up view showing the action of the securing tongues of the insert in threaded engagement with the threads on the locking rod.

The complete knob construction or the like thus provided, is admirably suited for quick and easy attachment to the end of the rod or other stud by a simple push or thrust-like operation by which the rod is received within the channel-shaped insert and the knob moved axially thereof to its assembled position in which the tongue extremities 21 are in threaded engagement with the threads 3 on the locking rod and have a binding thread locking action thereon under constant spring tension. The operation is such that the locking rod is readily received in the channel body of the insert in frictonal engagement therewith, and inasmuch as the channel-shaped shank sections 12 are resilient, they expand as necessary to permit the end of the locking rod to pass through the insert to the position in which the thread portion 3 is engaged by the tongue extremities 21. The tongues 20 also yield and thereby permit the tongue extremities 21 to ratchet over the threads 3 on the locking rod to the applied position of the knob shown in Fig. 5. In this position, as seen in Fig. 6, the body of the insert is in frictional bearing engagement with the cylindrical rod portion 4 of the locking rod such that the knob is firmly and rigidly retained thereon. The knob is also locked in such position by the thread locking action of the tongue extremities 21 on the threads 3 on the locking rod under the influence of the constant spring tension set-up in the tongues as a result of the passage of the locking rod therebetween causing the tongues to flex generally outwardly from their initial inwardly biased relation when normally untensioned.

Figure 7:
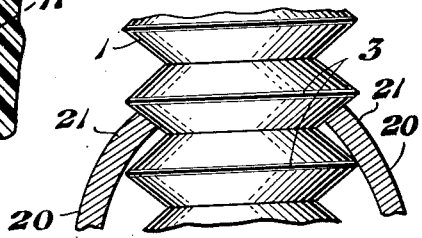
Figure 4:
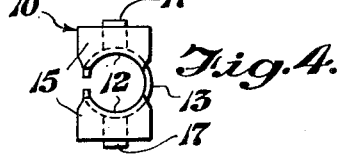
Fig. 4 is a plan view showing the formation of the head of the insert.

The tongue extremities 21 otherwise are in uniform threaded engagement with the threads 3 on the locking rod as shown in Fig. 7 and accordingly, in the event that it is necessary to remove the knob for purposes of servicing the door, for example, the knob may be removed readily simply by turning the same in the conventional manner to unscrew the tongue extremities 21 from the threads 3 whereupon the knob may be slipped off the rod by a pull thereon. Thereafter, the knob may be reattached to the locking rod by a simple axial push in a repetition of the foregoing described procedure.

It will be appreciated that the improved connection of the invention has a wide range and variety of applications both in installations in which the knob or the like is the operating member for a rod or shaft, as well as installations in which the knob or other part is the operating member which is actuated by or is otherwise associated with the rod or shaft.

While the invention has been described in detail with a specific example, such example is intended as an illustration only, since it will be apparent to those skilled in the art that other modifications in the construction, arrangement and general combination of parts may be de-

What is claimed is:

1. In a connection, a rod or shaft having a threaded or serrated portion defining a series of transverse shoulders thereon, a part having a bore and a fastener in said bore comprising a channel-shaped sheet metal body receiving said rod in frictional bearing engagement therewith, an outwardly extending flange on one end of said body engaging said part adjacent the bore therein and preventing inward movement of said fastener in said bore, an outwardly projecting lug on said body anchoring the fastener in said bore, and a resilient tongue carried by said body engaging a transverse shoulder on said rod in binding relation therewith.

2. In connection, a rod or shaft having a threaded or serrated portion defining a series of transverse shoulders thereon, a part having a bore and a fastener in said bore comprising a channel-shaped sheet metal body defining a pair of spaced shank sections receiving said rod in frictional bearing engagement therewith, an outwardly extending flange on one end of said body engaging said part adjacent the bore therein and preventing inward movement of said fastener in said bore, an outwardly projecting lug struck from at least one of said shank sections and bent outwardly out of the plane thereof and anchoring the fastener in said bore, and a pair of cooperating tongues carried by said shank sections having inturned extremities engaging a transverse shoulder on said rod in binding relation therewith.

3. In a connection, a rod or shaft having a threaded or serrated portion defining a series of transverse shoulders thereon, a rubber or other plastic part having a bore and a fastener in said bore comprising a channel-shaped sheet metal body defining a pair of spaced shank sections receiving said rod in frictional bearing engagement therewith, an outwardly extending flange on the outer end of said body engaging said part adjacent the bore therein and preventing inward movement of said fastener in said bore, an outwardly projecting lug struck from each of said shank sections and bent outwardly out of the plane thereof and embedded in the material of said rubber or plastic part adjacent said bore to anchor the fastener therein, and an elongate resilient tongue carried by each of said sections extending from the inner end of the fastener body axially of the rod and having inturned extremities engaging a transverse shoulder on said rod in binding relation therewith.

4. An insert for a knob connection or other part, comprising a channel-shaped sheet metal body defining a pair of spaced shank sections receivable in an opening in said part, a tongue on each of said shank sections at the inner end of said body as receivable in said opening, said tongues extending generally axially of said body and having transverse edges on their extremities extending inwardly toward each other, a lug element on the intermediate portion of each of said shank sections projecting outwardly out of the planes thereof, and outwardly extending flanges on the outer ends of said spaced shank sections for engaging the outer surface of said part adjacent said opening therein.

GEORGE A. TINNERMAN.

REFERENCES CITED

The following references are of record in the file of this patent:

UNITED STATES PATENTS

| Number | Name | Date |
|---|---|---|
| 652,426 | Clark | June 26, 1900 |
| 679,515 | Scott | July 30, 1901 |
| 859,200 | Clark | July 9, 1907 |
| 1,354,549 | Gilmer | Oct. 5, 1920 |
| 1,597,925 | Schultz | Aug. 31, 1926 |
| 1,911,916 | Menamin | May 30, 1933 |
| 1,937,864 | Ashley, Jr., et al. | Dec. 5, 1933 |
| 2,208,548 | Murphy | July 16, 1940 |
| 2,244,975 | Tinnerman | June 10, 1941 |
| 2,293,615 | Murphy | Aug. 18, 1942 |
| 2,295,444 | Woodward | Sept. 8, 1942 |
| 2,336,153 | Ryder | Dec. 7, 1943 |

FOREIGN PATENTS

| Number | Country | Date |
|---|---|---|
| 547,988 | Great Britain | Sept. 21, 1942 |